United States Patent
Hartmann et al.

Patent Number: 5,683,669
Date of Patent: Nov. 4, 1997

[54] METAL CHLORIDE GENERATOR AND IMPROVED PROCESS FOR THE PRODUCTION OF METAL CHLORIDES USED IN THE MANUFACTURE OF TITANIUM DIOXIDE BY THE CHLORIDE PROCESS

[75] Inventors: Achim Hartmann, Pulheim; Herman Trüb, Leverkusen, both of Germany

[73] Assignee: Kronos Inc., Hightstown, N.J.

[21] Appl. No.: 621,678

[22] Filed: Mar. 26, 1996

[30] Foreign Application Priority Data

Apr. 20, 1995 [DE] Germany ............ 195 14 663.8

[51] Int. Cl.⁶ ............................................ C01B 9/02
[52] U.S. Cl. .................. 423/491; 423/492; 423/495; 423/494
[58] Field of Search ................... 423/495, 491, 423/492, 494; 106/437

[56] References Cited

U.S. PATENT DOCUMENTS

| | | | |
|---|---|---|---|
| 3,078,145 | 2/1963 | Gayol | 423/495 |
| 3,343,911 | 9/1967 | Eisenlohr | 423/495 |
| 3,446,579 | 5/1969 | Toomey et al. | 106/437 |
| 3,615,182 | 10/1971 | Moles et al. | 423/495 |
| 3,730,748 | 5/1973 | Lailuch et al. | 106/437 |
| 4,774,064 | 9/1988 | Arnold et al. | 423/168 |
| 5,536,487 | 7/1996 | Hartmann | 423/613 |

FOREIGN PATENT DOCUMENTS

| | | | |
|---|---|---|---|
| 406693 | 9/1966 | Australia | 423/495 |
| 2256283 | 11/1972 | Germany | 106/437 |
| 2032545 | 2/1980 | Germany | 423/495 |

*Primary Examiner*—Ngoc-Yen Nguyen
*Attorney, Agent, or Firm*—Michael J. Cronin

[57] ABSTRACT

In the preparation of metal chlorides from their elements to be used as additives in processes of making titanium dioxide by the chloride process, a titanium tetrachloride stream is directed to sweep over the lined inner wall of a metal chloride generator to act as a protective film, which considerably increases the life of the generator. Furthermore, the titanium tetrachloride is further heated, which is highly desirable in the chloride process. When the titanium tetrachloride is optionally conducted in advance through ducts in the lining of the inner walls of the metal chloride generator, its temperature can be further raised.

6 Claims, 1 Drawing Sheet

Fig. 2    A-A

METAL CHLORIDE GENERATOR AND IMPROVED PROCESS FOR THE PRODUCTION OF METAL CHLORIDES USED IN THE MANUFACTURE OF TITANIUM DIOXIDE BY THE CHLORIDE PROCESS

CROSS REFERENCE TO RELATED APPLICATION

This application is a United States counterpart application to originating German Patent Application No. 195 14 663.8 filed Apr. 20, 1995, the disclosure of which is hereby incorporated by reference and is related to U.S. patent application Ser. No. 08/395,553 entitled Improved Process For The Use Of Rutile Promoter And Control Additives In The Manufacture Of Titanium Dioxide By The Chloride Process, filed Feb. 27, 1995, now U.S. Pat. No. 5,536,487.

FIELD OF THE INVENTION

The product and process of the present invention relates to the manufacture of titanium dioxide by the chloride process. Titanium dioxide is useful for pigmentary and other purposes. In the chloride process after substantial processing of raw materials, gaseous titanium tetrachloride is reacted or combusted with oxygen in a burner oxidation reactor unit or zone to produce pure titanium dioxide. As part of such oxidation reaction, oxidation and rutile promoting additives, as explained hereafter, are commonly introduced into the burner oxidation reactor unit. Such chemicals are added to provide improved optical properties to the titanium dioxide end-product.

The invention is focused on a process for forming metal chlorides, to be used as an oxidation and rutile promotion additive, from a reaction of chlorine and at least one metal, normally aluminum, in a metal chloride generator and the subsequent admixture of the metal chloride into a titanium tetrachloride stream on route to the titanium dioxide burner oxidation reactor zone. The invention also covers an apparatus for generating such metal chloride (or a mixture of metal chlorides), preferably comprising a reaction compartment lined with refractory bricks or similar material, an inlet nozzle for the metal or metal mixture dispersed in a gas stream, inlet nozzles for chlorine in the upper region of the reaction compartment and a gas outlet in the lower region of the compartment.

DESCRIPTION OF THE PRIOR ART

The production of titanium dioxide by vapor phase oxidation of titanium tetrachloride with oxygen or an oxygen-containing gas has been growing in importance compared with older processes in which titaniferous raw materials such as ores and/or slag are digested with mineral acids, preferably sulfuric acid. Among the several reasons for this growing acceptance is that, in the vapor phase chloride oxidation, only solid or gaseous reaction products are generated. Thus, no dilute liquid waste acid is created, requiring additional process steps and higher operating costs for concentration and treatment. Furthermore, the chloride process is more efficient, and produces, in the view of many customers of titanium dioxide pigments, better quality titanium dioxide.

During the oxidation of titanium tetrachloride, the temperatures in the oxidation reactor range between 1000° and 2000° C., the variation in temperature being essentially dependent upon whether air, oxygen or a mixture of both is used as the oxidation agent, and upon whether or not additional energy is introduced prior to oxidation, for instance in the form of an auxiliary flame, usually toluene, or by preheating the oxygen or air utilized. U.S. Pat. No. 5,196,181 assigned to Kronos Inc., the assignee hereof, discloses a co-invention of the same inventor herein, and describes at length the construction and operation of a burner reaction chamber or zone (an "oxidation reactor") used in the manufacture of titanium dioxide by the chloride process. The stream of hot reaction products (often referred to as the "reaction mixture") exiting from this oxidation reactor contains nearly pure titanium dioxide in a very finely-distributed form, suspended in gaseous constituents.

Titanium dioxide pigment is widely used in a large variety of industry as an opacifying pigment in paints and paper coatings, and as a pigmentary agent for a large range of fibers and textiles as well as for numerous other uses. To create or enhance specially desired pigmentary properties for particular end uses, the pigment is conventionally coated or mixed with other substances, and subjected to a wide variety of treatments.

It is well-known that the crystalline structure of titanium dioxide can vary. A very preferred crystalline structure, particularly for obtaining enhanced optical properties which most efficiently refract and reflect light so that the most desirable opacifying properties are obtained is the "rutile" modification.

Chemicals that promote the formation of rutile titanium dioxide crystals have been introduced into the titanium dioxide manufacturing process in the past. For example, if an aluminum compound, notably an aluminum salt such as $AlCl_3$, (aluminum trichloride), is added to the titanium tetrachloride stream, the titanium dioxide product so produced is found to have an increased rutile content, typically in excess of 90 percent, in most cases above 99 percent. In this regard, see, for example, U.S. Pat. Nos. 2,559,638 and 3,214,284.

Metal chlorides, in particular aluminum trichloride in most actual commercial operations, are in fact usually required in the preparation of titanium dioxide not only as rutile promotion additives but also to influence particle size distribution and stability influencing the pigment's quality. Such metal chlorides are formed almost immediately, before they are fed into the oxidation reactor, from the reaction of chlorine and finely divided metal. This metal-chlorine reaction is an exothermic reaction and occurs in the commercial manufacture (of chloride-process titanium dioxide) in a reactor. This reactor is customarily termed a metal chloride (or an aluminum chloride) generator. The reacted metal chloride in a gaseous state is then preferably mixed with the titanium tetrachloride gas stream on its way to the oxidation reaction. An exothermic reaction is a chemical reaction accompanied by the evolution of heat; the reaction of titanium tetrachloride and oxygen is an exothermic reaction which however requires high temperatures, provided by outside sources, for initiation.

The addition of such an aluminum-based or similar metal compounds to the oxidation reaction zone causes no loss in the titanium dioxide pigment's other beneficial properties. This same result is reported to occur when zirconium salt, particularly zirconium tetrachloride, is similarly added to the oxidation reaction. DuPont United Kingdom Patent No. 2037266A includes both silicon and phosphorous chlorides among the compounds useful for this purpose. German Patent DE 2032545, published in July, 1980 (and which has no English language counterpart), refers to zinc chloride as well as aluminum trichloride and zirconium tetrachloride as being useful for rutile promotion purposes, and shows ways of preparing such compounds. It should be noted that the metal chlorides involved are oxidized in the oxidation reactor and become, for example when aluminum is employed, aluminum oxide ($Al_2O_3$), in the final titanium dioxide pigment.

The amounts of such pigment quality influencing compounds added to the oxidation reaction may vary within a great range, although it is advisable to employ from about 0.5 to about 10 weight percent. This gives a corresponding concentration of the aluminum oxide or other metal oxide compound in the final titanium dioxide pigment. In this regard, U.S. Pat. No. 3,640,745 describes a process for the production of pigmentary titanium dioxide, where certain additives are introduced to the oxidation reaction zone to improve the titanium dioxide produced, so that a more acceptable commercial pigment is obtained. Metallic aluminum or an aluminum compound, notably an aluminum salt, such as aluminum trichloride, is added to the oxidation reaction zone, by means of the titanium tetrachloride reactant stream or one or more other suitable gaseous streams entering the reactor. The titanium dioxide product so produced was found to have an increased rutile content. The amount of rutile-promoting additives transmitted to the oxygen reaction zone is described as varying within a wide range, although typically described as employed in an amount sufficient to provide between about 0.5 and about 10 weight percent, preferably between about 1 and about 5.0 weight percent, and more preferably from about 1.5 to about 2.0 weight percent of metal oxide in the final titanium dioxide pigment.

Both previously discussed German Patent No. 2032545 and U.S. Pat. No. 3,542,521, obtained by a predecessor to the assignee herein, show a method of making aluminum trichloride for use in a titanium dioxide manufacturing process. Finely dispersed aluminum, suspended in nitrogen, is blown in and reacted with chlorine in a chamber; the aluminum trichloride thus formed by the highly exothermic reaction is then discharged from the chamber together with the unconverted chlorine and nitrogen, and introduced into the combustion space of the titanium tetrachloride oxidation reactor.

While not directly material to this invention, another German Patent of assignee's predecessor, German Patent No. 373 1199 (which was not filed in the United States) shows that the aluminum, in powder form, can effectively be pretreated to improve its flow properties. The aluminum powder used is treated with an alkali metal oleate in order to reduce the cold-sintering tendency of the aluminum powder. DuPont German Patent No. 1,262,985 (which has no United States counterpart), published in 1968, discloses that the presence of alkali metal ions and alkaline earth metal ions during the oxidation of titanium tetrachloride has an influence on the particle size and quality of the titanium dioxide pigments and affects the "carbon-black undertone", which is an important pigment property. According to said German Patent No. 1,262,985, such alkali metal ions are sprayed as an aqueous solution into the oxidation reactor. It is also disclosed that pigments of the rutile type are particularly formed if aluminum trichloride is simultaneously present with such ions.

In the process for preparing a metal chloride or a metal chloride mixture disclosed by the previously mentioned German Patent No. 2032545, it is also specified that the walls of a generator for producing such metal chlorides be lined with ceramic material in order to better protect the metallic shell of the generator against heat degradation and corrosion. DE 2032545 also describes the process conditions to be maintained when a mixture of different metal chlorides is to be generated. It is likewise disclosed in the patent that the heat arising in the formation of metal chlorides can be utilized for the further heating of the titanium tetrachloride. In the referenced patent, some of the titanium tetrachloride vapor used in the chloride process is passed into the reaction compartment and taken off together with the metal-chloride-containing gas mixture. Assignee's U.S. patent application Ser. No. 08/395,553, now U.S. Pat. No. 5,536,487, describes an aluminum trichloride generating reactor wherein a titanium tetrachloride stream is introduced into the reaction at 350° C. and has its temperature raised by 100° C. by the exothermic reaction of the aluminum and chlorine. Recent 1994 Tioxide European Patent Application No. 0583063 A1 describes an aluminum chloride generating apparatus where titanium tetrachloride is mixed with aluminum chloride so that the heat of reaction is used as a means of raising the temperature of the titanium tetrachloride.

Because of the extreme exothermic quality of the reaction of metal and chlorine, temperatures above 2000° C. occur in the core of the reaction zone. The reaction between aluminum metal and chlorine in fact is particularly strongly exothermic. For this reason it has been difficult to control, and local high temperature overheating occurs frequently. The aluminum metal can sinter or melt forming fairly large lumps which can impede the reaction and aggravate the charging of additional aluminum metal into the reactor. Moreover an "alloy" can be formed between the material of the reactor wall and the molten aluminum thus damaging the reactor. In addition, corrosion by the hot gases containing chlorine can occur at overheated spots as a consequence of which the aluminum chloride may be contaminated by the reactor wall material. At "colder" places in the reactor aluminum chloride can condense and cause clogging.

Because of the above described very high thermal stress, the life of the lining of a metal chloride generator is restricted. Such reactors are therefore today lined on the interior of their metal walls with ceramic material, refractory bricks and similar protective products to shield their metal walls from the corrosion and high temperatures encountered. Even such lined walls however, because of such extreme temperatures to which they are subjected on a normal, continuing and constant twenty-four hour basis, must often be replaced. The art has long sought for a way to eliminate or reduce frequent shutdowns for replacement of this important piece of equipment of the titanium dioxide chloride process production line.

It must also be considered a severe disadvantage of prior art metal chloride reactors that, as described in previously discussed German Patent DE 2032545, the generator must be preheated to ignition before the reaction is begun, which is normally performed in the art by either an auxiliary flame, which must be provided by a burner introduced separately into the metal chloride reaction chamber or, as described in U.S. Pat. No. 3,542,521 by preheating the aluminum or other metal before it enters the metal chloride reactor.

OBJECT OF THE INVENTION

The object underlying the invention is both to substantially increase the life and reliability of an apparatus for generating metal chlorides and to markedly improve further the overall economic efficiency in the preparation of titanium dioxide by the chloride process by reducing the energy input required. A further object is to initiate the metal/ chloride reaction in a simple manner without the need for a dedicated ignition apparatus. This object is achieved by relatively small changes in existing metal chloride generating apparatus in a manner which has escaped workers in the field for long number of years.

DESCRIPTION OF THE PREFERRED EMBODIMENTS

The problem is solved in terms of the inventive process by the hot metal chlorides being kept from direct wall contact in the metal chloride generator by use of a titanium tetrachloride stream sweeping over the internal wall surfaces of the generator, in the manner of a film, in the same general direction as the hot metal chlorides.

The problem is solved in terms of the inventive apparatus by a gas inlet, most preferably a coaxial gas inlet being present in the upper region of the reaction compartment around or near the usually centrally arranged inlet nozzle or nozzles, which gas inlet is constructed in such a way that the titanium tetrachloride gas entering the reaction compartment through this inlet sweeps across the lining of the wall surfaces of the generator in the manner of a film.

Further advantageous developments of the invention are described below.

It must be considered a surprising advantage of the invention that the relatively small rearrangement of an apparatus, long known and used in the art, leads to a marked increase in reliability and life of the apparatus, and that the process change made possible by the instant invention also leads to a problem-free marked increase in the temperature of the titanium tetrachloride used in the process, which provides substantial energy savings in the overall titanium dioxide manufacturing process.

The invention is represented in the drawings which are to be further considered an example of an embodiment of the invention as described below.

BRIEF DESCRIPTION OF THE DRAWINGS

In the drawings:

FIG. 2 shows a cross-section through the metal chloride generator of FIG. 1.

DESCRIPTION OF PREFERRED EMBODIMENTS

The metal chloride generator in this example had an essentially cylindrical shape; it was operated in a vertical position, which is customary, the reactants (finely divided aluminum metal and chlorine) were fed into an upper region of the generator and hot metal chloride gases exited through an orifice in the lower region of the generator. Other configurations are of course possible, although the one shown is preferred.

Figure 1:
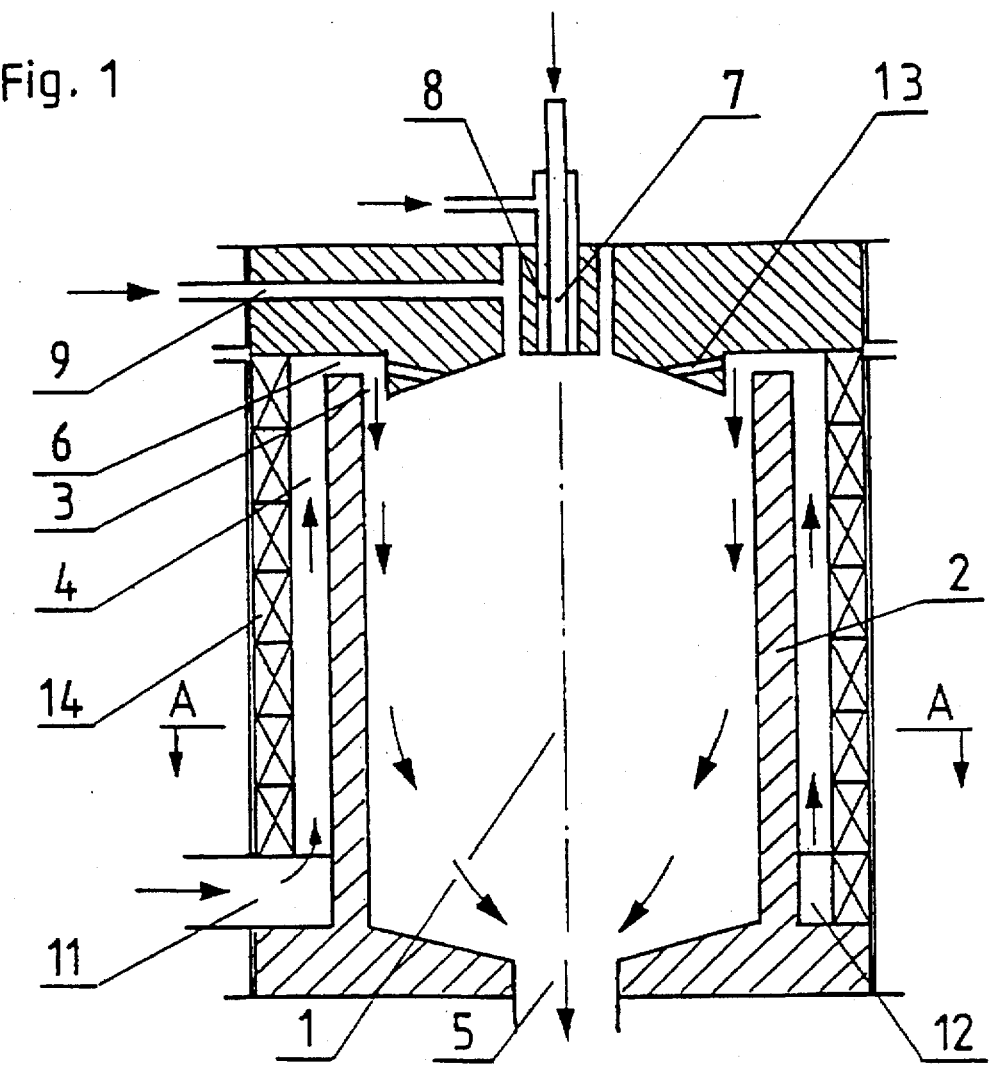
FIG. 1 shows a longitudinal section through a representative metal chloride generator, in this case an aluminum chloride generator.
Figure 1:
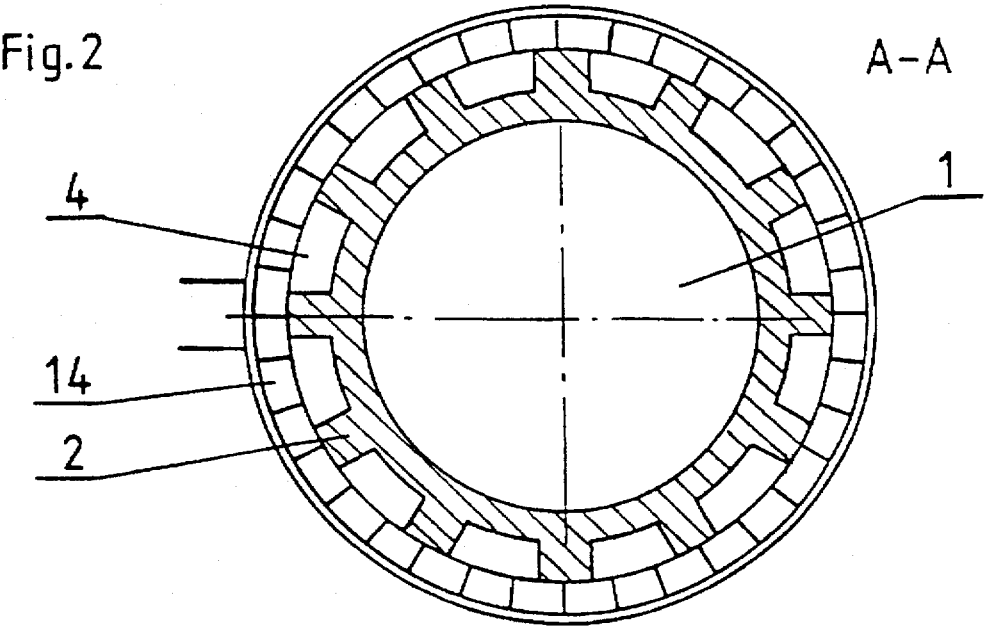

In the specific metal chloride generator embodiment according to FIGS. 1 and 2, the cylinder-like reaction compartment 1 was closed at the top by a cover. The interior wall area had a refractory brick lining 2. The titanium tetrachloride gas stream, which was produced upstream according to the chloride process and whose temperature can vary, entered the reaction area from an annular gap 3, indicated by arrows, and swept over the refractory brick lining in the manner of a protective film on its inside surface. Additionally according to one alternative aspect of the invention, the refractory brick lining was also cooled by the titanium tetrachloride in the ducts 4 behind the brick lining 2; note that such cooling could also occur within the wall lining. The metal chlorides formed, mixed with the "cooling gas", left the reaction compartment 1 through an outlet orifice 5.

The ducts 4 lead to a distributor ring 6 and ensured a uniform gas feed into the annular gap 3; note however that a wide variety of alternatives can also produce the desired protective film effect. An essentially laminar "cooling stream" over the lining 2 is sought after, which can preferably be achieved by a gas velocity in the annular gap 3 being set corresponding to a Reynolds number between around 500 and 1500. Such a flow surprisingly acts as a shield keeping the extremely hot metal chlorides (temperatures can reach 2000° C.) from direct wall contact with the lining employed. Such a "cooling gas" film mixes relatively late with the hot metal chloride or chlorides produced by the reaction. The metal particles (usually aluminum, frequently also mixed with zirconium and/or zinc and/or tin in commercial operation), suspended in nitrogen, were introduced into the reaction compartment 1 via a nozzle 7. The chlorine gas was fed in via the inlets 8 and 9.

The metal chloride generator depicted in the drawing is particularly suitable for generating metal chloride additives required by titanium dioxide pigment made by the chloride process. In this use, the cooling gas was titanium tetrachloride, which enters the metal chloride reactor at temperatures between 200° C. and 800° C., in this example the temperature was 350° C., in a port 11 in combination with an annular duct 12. The generator in this specific case had an inner diameter of approximately 800 mm and was about 2400 mm high; a wide variety of sizes are used in the industry. The throughput of a production line using this specific generator was designed for an hourly consumption of around 16 tons of titanium tetrachloride.

In this specific example, the cooling gas stream was divided in the wall area into 12 ducts 4. Approximately 50 kg of aluminum per hour, suspended in 30 m$^3$/h of nitrogen, were introduced via the nozzle 7 and 65 cubic meters of chlorine per hour were fed in via each of the lines 8 and 9. The amount of chlorine was in this case superstoichiometric with respect to the metal(s) added. A wide variety of different amounts and quantities of raw materials are of course useful in carrying out the instant invention.

An unexpected other advantageous development of the inventive generator apparatus is indicated in FIG. 1, see particularly ducts 13. A portion of the titanium tetrachloride was passed from the distributor ring 6 through these ducts immediately in the vicinity of the inlet nozzles 7 and 8 which assured that the temperature around the inlet nozzles, when the generator at the start is only at room temperature, was sufficient to bring the metal powder and chlorine exiting to reaction immediately without further aid; auxiliary burners or metal pre-heating believed necessary in the past can be dispensed with by use of the apparatus made according to the invention.

Because of the highly effective cooling of the generator lining by the titanium tetrachloride gas, according to this invention, the service life of the generator can be expected to be increased by more than a factor of 3 over existing apparatus. This 300% life increase of a major piece of apparatus in the manufacture of titanium dioxide by the chloride process is exceptional in the extreme.

In the example, the gas mixture exiting from the orifice 5 and conducted to a titanium dioxide burner was raised to a temperature of about 480° C. which resulted in a corresponding reduction of additional energy input to the titanium dioxide burner. In order to avoid unnecessary heat radiation by the titanium tetrachloride flowing in the ducts 4, an additional insulation layer 14 was installed in the generator.

The foregoing description and examples have been set forth merely to illustrate the invention and are not intended to be limiting. Since modifications of the disclosed embodiments incorporating the spirit and substance of the invention may easily occur to persons skilled in the art, the invention should be construed to include everything within the scope of the appended claims and equivalents thereof.

We claim:

1. A process for forming metal chloride or chlorides, useful as additives in the manufacture of titanium dioxide by the chloride process, from chlorine and at least one metal by an exothermic reaction in a metal chloride generator, comprising:
   a) introducing said metal or metals and chlorine into a metal chloride generator, said metal chloride generator having interior lined wall surfaces and ducts behind or within the interior lined wall surfaces,
   b) reacting the metal or metals and chlorine to form metal chloride or chlorides,
   c) flowing a titanium tetrachloride stream through said ducts behind or within the interior lined wall surfaces of the metal chloride generator,
   d) sweeping over the interior lined wall surfaces of the metal chloride generator said titanium tetrachloride stream in a manner so that the metal chloride or chlorides are substantially kept from direct wall contact in the generator, and
   e) removing the titanium tetrachloride stream and the metal chloride or chlorides from the metal chloride generator.

2. The process of claim 1, wherein the metal or metals and chlorine are fed into the metal chloride generator at one end and the titanium tetrachloride stream enters the metal chloride generator in the vicinity of the same end.

3. The process of claim 1, wherein the metal or metals used are selected from the group consisting of aluminum, zinc, zirconium, tin and mixtures thereof.

4. The process of claim 1 wherein the metals or metal used are suspended in a nitrogen stream prior to reaction with chlorine.

5. The process of claim 1, wherein some of the titanium tetrachloride stream is directed at the point where the metal or metals and the chlorine are introduced into the metal chloride generator so that the reaction between the metal or metals and the chlorine is initiated without further aid.

6. A process for forming metal chloride or chlorides, useful as additives in the manufacture of titanium dioxide by the chloride process, from chlorine and at least one metal by an exothermic reaction in a metal chloride generator, comprising:
   a) introducing said metal or metals and chlorine into a metal chloride generator,
   b) introducing a titanium tetrachloride stream heated to a temperature of 350° C. or more into the metal chloride generator in such a manner that said stream ignites the exothermic reaction of the chlorine and the metal or metals,
   c) reacting the metal or metals and chlorine to form metal chloride or chlorides, and
   d) removing the titanium tetrachloride stream and the metal chloride or chlorides from the metal chloride generator.

* * * * *